US012579193B2

US 012579193B2

(12) United States Patent
Issa Garcia et al.

(10) Patent No.: US 12,579,193 B2
(45) Date of Patent: Mar. 17, 2026

(54) SELF-DISCOVERY AND CONSTRUCTION OF TYPE-SENSITIVE COLUMNAR FORMATS ON TYPE-AGNOSTIC STORAGE SERVERS TO ACCELERATE OFFLOADED QUERIES

(71) Applicant: Oracle International Corporation, Redwood Shores, CA (US)

(72) Inventors: Jorge Luis Issa Garcia, Zapopan (MX); Teck Hua Lee, Newark, CA (US); Sheldon Andre Kevin Lewis, Zapopan (MX); Bangalore Prashanth, Redwood City, CA (US); Hui Joe Chang, San Jose, CA (US); Zhen Hua Liu, San Mateo, CA (US); Aurosish Mishra, Foster City, CA (US); Shasank K. Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/375,122

(22) Filed: Sep. 29, 2023

(65) Prior Publication Data

US 2024/0126816 A1 Apr. 18, 2024

Related U.S. Application Data

(60) Provisional application No. 63/417,275, filed on Oct. 18, 2022.

(51) Int. Cl.
G06F 16/903 (2019.01)
(52) U.S. Cl.
CPC .............................. G06F 16/90335 (2019.01)
(58) Field of Classification Search
CPC .................................................. G06F 16/90335
See application file for complete search history.

(56) References Cited

U.S. PATENT DOCUMENTS 5,291,583 A * 3/1994 Bapat .................... G06F 16/284
717/137
7,743,363 B2 * 6/2010 Brumme ............. G06F 9/45516
717/170

(Continued)

FOREIGN PATENT DOCUMENTS

WO     WO 2017/070188 A1     4/2017
WO     WO 2020/005937 A1     1/2020

OTHER PUBLICATIONS

"A Technical Overview of the Oracle Exadata Database Machine and Exadata Storage Server" Oracle White Paper—A Technical Overview of the Oracle Exadata Database Machine and Exadata Storage Server, Dec. 1, 2023, pp. 1-43.

*Primary Examiner* — Vaishali Shah
(74) *Attorney, Agent, or Firm* — Hickman Becker Bingham Ledesma LLP

(57) ABSTRACT

Herein is database query acceleration from dynamic discovery of whether contents of a persistent column can be stored in an accelerated representation in storage-side memory. In an embodiment, based on data type discovery, a storage server detects that column values in a persistent column have a particular data type. Based on storage-side metadata including a frequency of access of the persistent column as an offload input column for offload computation requests on a certain range of memory addresses, the storage server autonomously decides to generate and store, in storage-side memory in the storage server, an accelerated representation of the persistent column that is based on the particular data type. The storage server receives a request to perform an (Continued)

offload computation for the offload input column. Based on the accelerated representation of the persistent column, execution of the offload computation is accelerated.

17 Claims, 4 Drawing Sheets

(56) References Cited

U.S. PATENT DOCUMENTS

| | | | |
|---|---|---|---|
| 8,832,142 B2 | 9/2014 | Marwah | |
| 10,204,135 B2 | 2/2019 | Mishra | |
| 10,333,709 B2 | 6/2019 | Dictos | |
| 10,552,443 B1 | 2/2020 | Wu et al. | |
| 10,558,693 B1* | 2/2020 | Elieson | G06Q 30/0623 |
| 10,684,986 B2* | 6/2020 | Ravuna | G16H 30/20 |
| 11,429,629 B1* | 8/2022 | Pedapati | G06F 16/248 |
| 2004/0103391 A1* | 5/2004 | Wu | G06F 9/4488 |
| | | | 717/122 |
| 2004/0143581 A1 | 7/2004 | Bohannon et al. | |
| 2005/0192941 A1 | 9/2005 | Biedenstein | |
| 2006/0047696 A1 | 3/2006 | Larson | |
| 2006/0074941 A1 | 4/2006 | Flynn | |
| 2011/0113036 A1 | 5/2011 | Idicula et al. | |
| 2013/0067441 A1* | 3/2013 | Lafreniere | G06F 8/41 |
| | | | 717/146 |
| 2014/0181591 A1* | 6/2014 | Bijanki | G06F 11/3696 |
| | | | 714/38.1 |
| 2014/0201244 A1 | 7/2014 | Zhou | |
| 2015/0032763 A1 | 1/2015 | Marwah et al. | |
| 2015/0088812 A1 | 3/2015 | Ziauddin et al. | |
| 2015/0088813 A1 | 3/2015 | Lahiri | |
| 2015/0149479 A1 | 5/2015 | Geringer et al. | |
| 2016/0350347 A1 | 12/2016 | Das | |
| 2017/0031975 A1 | 2/2017 | Mishra | |
| 2017/0116273 A1 | 4/2017 | Liu et al. | |
| 2017/0206199 A1 | 7/2017 | Umamageswaran et al. | |
| 2018/0351780 A1* | 12/2018 | Atanasov | H04L 69/40 |
| 2019/0034493 A1* | 1/2019 | Gopal | G06F 9/30038 |
| 2020/0210398 A1* | 7/2020 | Liu | G06F 16/282 |
| 2020/0233882 A1* | 7/2020 | Ichilevici de Oliveira | |
| | | | G06F 9/4552 |
| 2021/0081389 A1 | 3/2021 | Liu et al. | |
| 2021/0081428 A1 | 3/2021 | Ravada | |

* cited by examiner

FIG. 2

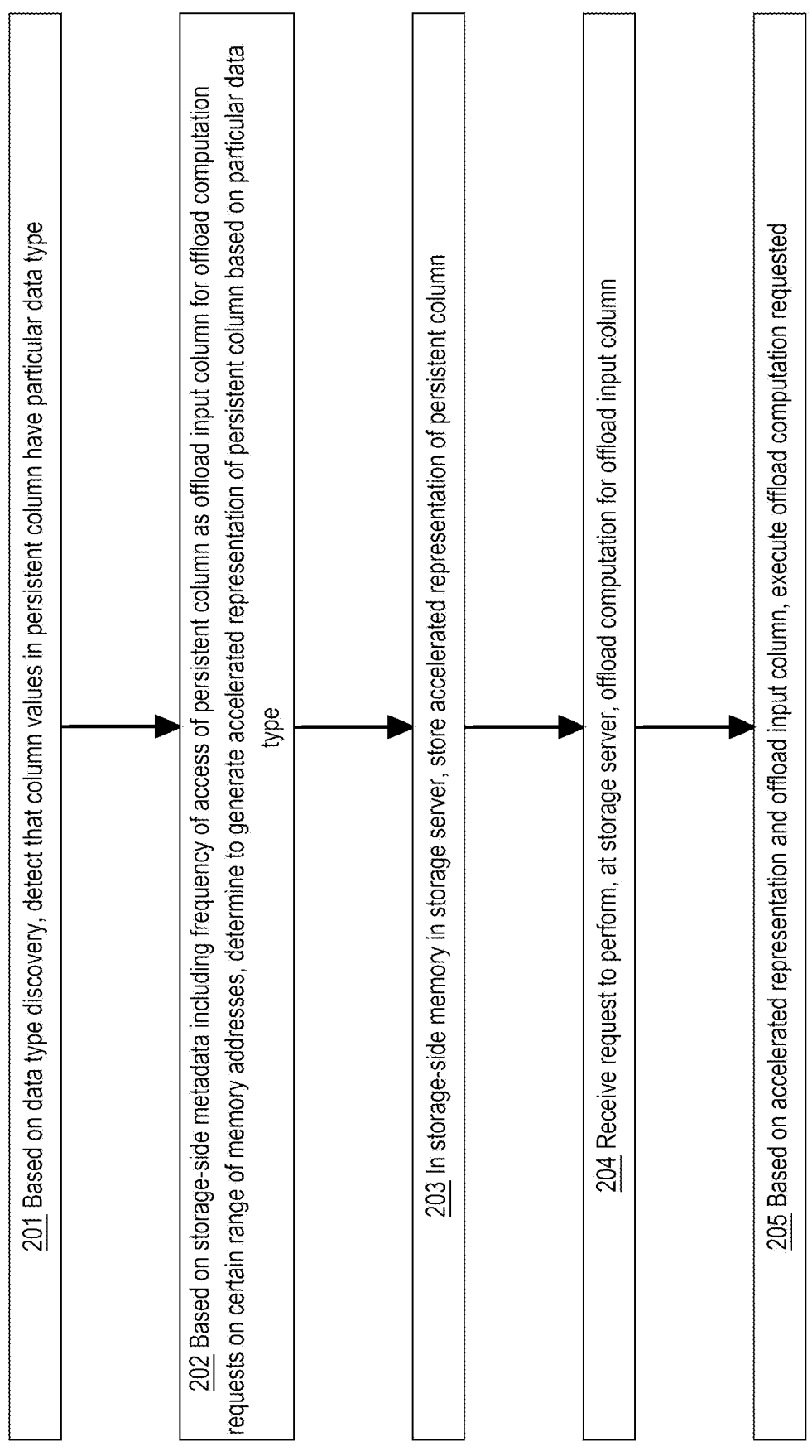

201 Based on data type discovery, detect that column values in persistent column have particular data type 202 Based on storage-side metadata including frequency of access of persistent column as offload input column for offload computation requests on certain range of memory addresses, determine to generate accelerated representation of persistent column based on particular data type 203 In storage-side memory in storage server, store accelerated representation of persistent column 204 Receive request to perform, at storage server, offload computation for offload input column 205 Based on accelerated representation and offload input column, execute offload computation requested

SOFTWARE SYSTEM 400

APPLICATION PROGRAM 1 — 402A

APPLICATION PROGRAM 2 — 402B

APPLICATION PROGRAM 3 — 402C

[...]

APPLICATION PROGRAM N — 402N

402

OPERATING SYSTEM
(e.g., WINDOWS, UNIX, LINUX, MAC OS, IOS, ANDROID, OR LIKE) — 410

GRAPHICAL USER INTERFACE (GUI) — 415

VIRTUAL MACHINE MONITOR ( VMM ) — 430

BARE HARDWARE (e.g., COMPUTING DEVICE 300)

SELF-DISCOVERY AND CONSTRUCTION OF TYPE-SENSITIVE COLUMNAR FORMATS ON TYPE-AGNOSTIC STORAGE SERVERS TO ACCELERATE OFFLOADED QUERIES

PRIORITY CLAIM

This application claims the benefit of Provisional Application 63/417,275, filed Oct. 18, 2022, the entire contents of which is hereby incorporated by reference as if fully set forth herein, under 35 U.S.C. § 119(e).

FIELD OF THE INVENTION

The present invention relates to database query acceleration. Herein is automation that dynamically discovers whether contents of a persistent column can be stored in an accelerated representation in storage-side memory.

BACKGROUND

Offloading is the ability of a system to delegate work to another system. Colocation is the ability to process data in place. Data in storage can be tiered in multiple storage levels having different respective performance characteristics and capital costs. For example, a database server may query bulk data, but the bulk data may be remotely stored. A database server and a remote storage server may provide a separation of concerns that may alleviate tension between some design constraints but, with that specialization of servers, the state of the art has a storage server that is more or less incapable of application computation.

Offload computation is the process of moving the low-level representation of an algorithm to run closer to the data's place of residence. This process speeds up computation, as a low-level representation of an algorithm is smaller than the actual data. Speed increases result from the reduction on data volume transmission from the data's place of residence at a storage server to a compute server where results are prepared for a client. Data in storage can be tiered in multiple storage levels (e.g., disk and flash) and resides in containers herein referred to as data units.

In a database system, data units contain columns that store information from a particular table. Each column can store a specific type of data such as numbers or dates. However, a database storage server has little or no information regarding the data types stored on disk. Information available to storage servers may mainly indicate where data resides, which database tables contain the data, and the size of each column value and position within a row. This information is used to determine which files contain the data to load into data units needed by a compute server.

For densely stored data such as tabular data, there might be little computation to offload. More elaborate data structures may be more computationally intensive. Hierarchical data objects such as semi-structured documents such as JavaScript object notation (JSON) or extensible markup language (XML) are sparse and inefficient to process. Design of a document database that operates at a same throughput as a relational database is a technical problem.

BRIEF DESCRIPTION OF THE DRAWINGS

In the drawings:

FIG. 2 is a flow diagram that depicts an example computer process that accelerates execution of an access request based on an accelerated representation in storage-side memory;

DETAILED DESCRIPTION

Figure 1:
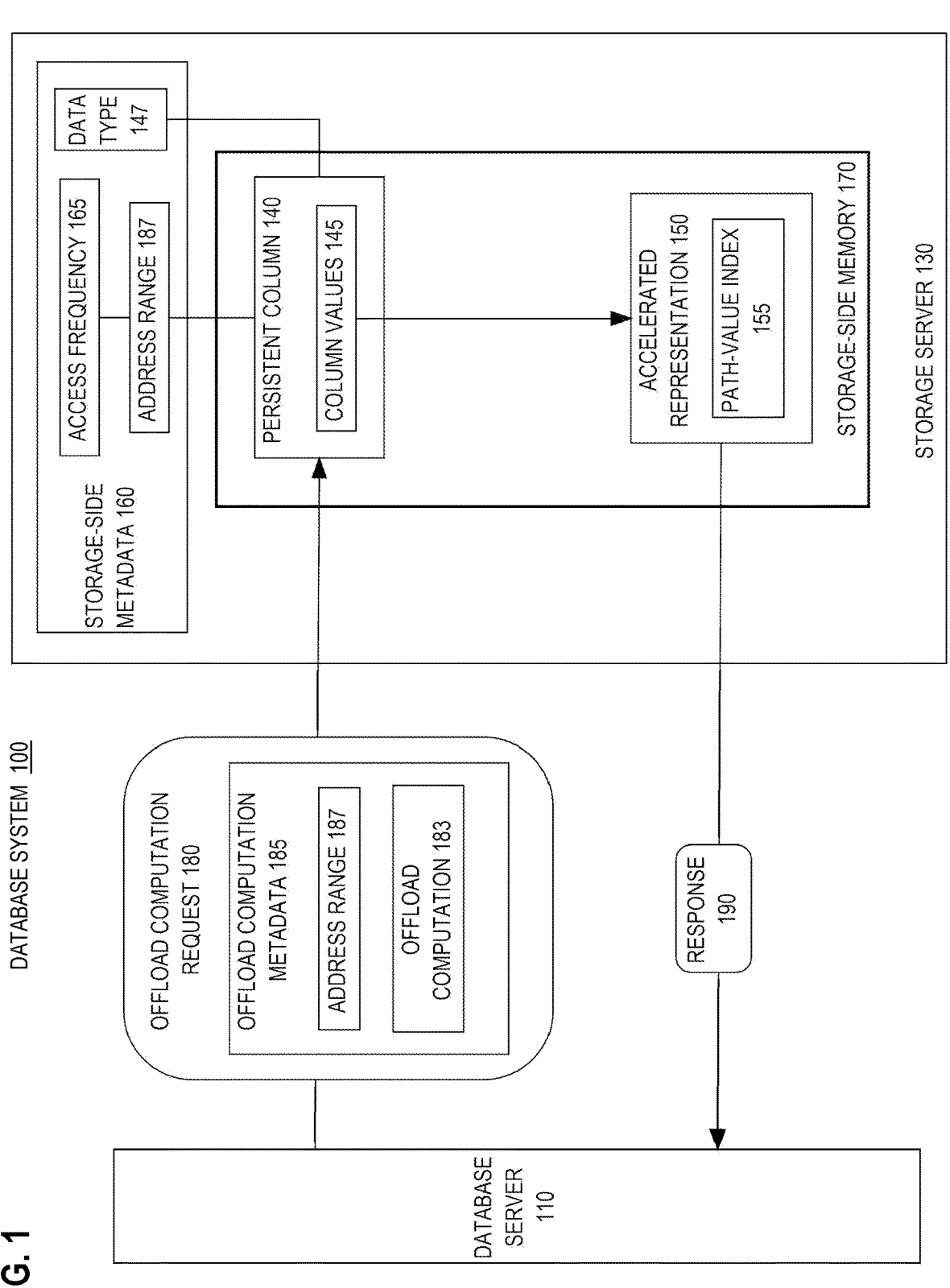
FIG. 1 is a block diagram that depicts an example database system that dynamically discovers whether original values in a persistent column can be stored in an accelerated representation in storage-side memory for accelerated execution of an access request by a storage server.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein is the automated generation by a "storage server" of accelerated representations for caching database content having a complex data type. An accelerated representation generated for a data type enables an enhanced storage server to perform offload computation on the data having that data type. An example of an accelerated representation is a path-value index. An example of an enhanced storage server is described in the following four U.S. patents that are incorporated herein by reference in their entirety.

U.S. Pat. No. 10,229,161 "Automatic Caching Of Scan And Random Access Data In Computing Systems" filed Sep. 17, 2014 by Sarat Kakarla et al.

U.S. Pat. No. 10,025,820 "Query And Exadata Support For Hybrid Columnar Compressed Data" filed Sep. 8, 2014 by Vineet Marwah, U.S. Pat. No. 8,473,506 "Type System For Building Extensible Business Applications" filed May 18, 2010 by Eric Sedlar et al.

U.S. Pat. No. 11,086,876 "Storing Derived Summaries On Persistent Memory Of A Storage Device" filed Sep. 29, 2017 by Krishnan Meiyyappan, et al.

The novel approaches described herein add data type discovery capabilities to enhanced storage servers to autonomously detect the data type of database content being stored at the enhanced storage server. Based on the data type detected, an enhanced storage server herein generates a respective accelerated representation for the database content. When an enhanced storage server receives a request to perform offload computation on the database content, the enhanced storage server generates special logic that is highly optimized for the accelerated representation.

In an embodiment, the database content contains hierarchical data objects such as JavaScript object notation (JSON) or extensible markup language (XML) that are sparse and inefficient to process. The accelerated representations herein are much more efficient to process.

The main stages of this approach are performed by a storage server, not a database server. These stages are:

1. Data type column discovery: Given a set of persistent columns for which only one or more ranges of memory addresses (e.g. data block addresses of same-length data blocks) are known, content contained in a column is dynamically analyzed to detect the data type of the column. Based on the discovered data type, a column may be flagged as containing a particular data type such as a data type that can have an accelerated format. This detection is autonomous by the storage server with no explicit database schema provided by the database server or user.

2. Accelerated column data representation: For each column of a discovered data type of interest, an enhanced accelerated representation is generated. This new representation is data type dependent and enables faster offload computations by an enhanced storage server.

3. Collocation of accelerated and non-accelerated formats of same data in cache: Each accelerated representation of a column is cached with the original data from which the accelerated representation was generated.

4. Specialized bytecode execution: Bytecode generated herein takes advantage of the accelerated representations. This bytecode is highly optimized for the accelerated data representation which allows the storage server to provide faster query executions.

This is the first approach to automatically build type-sensitive columnar acceleration structures in a type-agnostic storage server. This approach provides the following benefits. This needs no code changes to the database server and no user intervention, such as hints or data annotation. Availability of results for offloaded computations such as filtering and aggregation is accelerated. This approach has a general and extendable design that allows for integration of novel accelerated representations, which may facilitate future proofing.

In an embodiment, based on data type discovery, a storage server detects that column values in a persistent column have a particular data type. Based on storage-side metadata including a frequency of access of the persistent column as an offload input column for offload computation requests on a certain range of memory addresses, the storage server autonomously decides to generate and store, in storage-side memory in the storage server, an accelerated representation of the persistent column that is based on the particular data type. The storage server receives a request to perform an offload computation for the offload input column. Based on the accelerated representation of the persistent column, execution of the offload computation is accelerated.

1.0 Example Database System

FIG. 1 is a block diagram that depicts an example database system 100, in an embodiment. Database system 100 dynamically discovers data type 147 of column values 145 in persistent column 140 and determines whether an accelerated representation 150 for persistent column 140 may be stored in storage-side memory 170 for accelerated execution, by storage server 130, of an offload computation request 180. Offload computation requests are described in the next section. Database system 100 contains database server 110 and storage server 130 that each may be at least one computer such as a rack server such as a blade, a personal computer, a mainframe, a virtual computer, or other computing device. Database server 110 may operate one or more databases such as a relational database, a columnar database, or a document store. In an embodiment, database server 110 hosts a database management system (DBMS).

Database server 110 may receive and fulfill database commands from database clients. For example, database server 110 may provide to clients an interface that accepts commands such as a data query language (DQL) query, a data manipulation language (DML) statement, a create read update delete (CRUD) command, or a query by example (QBE). For example, database server 110 may accept and process a structured query language (SQL) statement.

Persistent column 140 contains column values 145 that are values of data type 147. Data type 147 may be a scalar data type such as a number or a text string, or may be a compound data type that contains multiple data fields. For example, each value of column values 145 may be a hierarchical data object such as a semi-structured document such as JavaScript object notation (JSON) or extensible markup language (XML), or a spatial object conforming to a spatial data type.

1.1 Enhanced Storage Server

Storage server 130 is enhanced to perform offload computation on columns stored within storage-side memory 170. Depending on the embodiment, storage-side memory 170 is volatile or nonvolatile. Depending on the embodiment, storage-side memory 170 is byte addressable or is block addressable such as flash, and address range 187 may identify block addresses of uniformly sized data blocks that may, for example, be storage blocks in persistent storage. If storage-side memory 170 is volatile, then persistent column 140 is stored in both storage-side memory 170 and in persistent storage such as disk or flash. Storage server 130 performs offload computation in response to offload computation requests sent by database server 110, such as offload computation request 180. Offload computation request 180 includes offload computation metadata 185 that defines offload computation 183 and one or more memory address ranges, such as address range 187 on which to perform offload computation 183.

For example, offload computation request 180 may be a filtered data block request described in U.S. Pat. No. 11,086,876 "Storing Derived Summaries On Persistent Memory Of A Storage Device". The filtered data block request includes offload computation metadata 185 that specifies a scan and filter operation as offload computation 183, the one or more ranges of data blocks to scan and filter, filtering criteria, and persistent column 140 in the data blocks to which to apply the filter criteria. Offload computation metadata 185 may specify persistent column 140 by identifying a position within rows in the data blocks.

In another example, offload computation request 180 may request to return rows that satisfy the json_contains function. Offload computation metadata 185 identifies a range of data block addresses as address range 187, persistent column 140, the json_contains function and its respective parameters, such as a path expression that a JSON object should satisfy. In response, storage server 130 may perform a functional evaluation of the JSON objects stored in persistent column 140 to determine whether the path expression is satisfied. Functional evaluation for a JSON object may entail streaming the JSON object to determine whether the JSON object satisfies the path expression. However, the streaming evaluation may be avoided when accelerated representation 150 is stored in storage-side memory 170 for persistent column 140. Accelerated representation 150 may be used to perform the computation of the json_contains function, enabling the result of the offload computation of the json_contains function to be performed much more efficiently as compared to performing the functional evaluation.

In yet another example, offload computation request 180 may request to return, in response 190, rows that contain spatial objects in persistent column 140 that satisfy spatial criteria. Offload computation metadata 185 identifies a range of data block addresses to scan, persistent column 140, the spatial_filter function and its respective parameters, such as spatial criteria that should be satisfied. In response, storage server 130 may perform a functional evaluation of the spatial objects stored in persistent column 140 to determine whether the spatial criteria is satisfied. However, when accelerated representation 150 is stored in storage-side memory 170 for persistent column 140, accelerated representation 150 may be used to perform the computation of the spatial_filter function, enabling the result of the offload computation of spatial_filter function to be performed much more efficiently as compared to performing the functional evaluation. A form of accelerated representation 150 is multiple in-memory column vectors that store spatial attributes of spatial objects that are stored in single persistent column 140, with column vectors such as those described in U.S. Pat. No. 11,507,590, "Techniques for In-Memory Spatial Object Filtering" filed on Jun. 17, 2020 by Siva Ravada, et al., the entire contents of which are incorporated herein by reference.

1.2 Storage-Side Metadata and Generating Accelerated Representations in Storage-Side Memory In response to offload computation requests, storage server 130 generates storage-side metadata 160 that storage server 130 derives from the offload computation requests. Herein, an offload input column is any persistent column that offload computation requests may reference, and persistent column 140 is an offload input column. Storage-side metadata 160 includes access frequency 165 that reflects the frequency of access of persistent column 140 for offload computation. Specifically, storage-side metadata 160 records: a) the frequency of offload computation requests to ranges of memory addresses and b) the frequency of persistent columns that are used as offload input columns within ranges of memory addresses or across ranges of memory addresses, such as address range 187. In an embodiment, a memory address is a block address of a storage block in persistent storage such as in flash or on disk. Based on any of these frequencies, storage server 130 may determine that access frequency 165 for persistent column 140 for offload computation merits creating accelerated representation 150 in storage-side memory 170 for one or more ranges of memory addresses.

Storage server 130 records, in storage-side metadata 160, data type 147 of persistent column 140 after storage server 130 discovers data type 147. Storage server 130 may discover data type 147 in several ways. In one way of data type discovery, storage server 130 may derive from offload computation request 180 for address range 187 that persistent column 140 within that range has data type 147. For example, storage server 130 receives offload computation request 180 to return rows that contain spatial objects in persistent column 140 that satisfy spatial criteria. From offload computation request 180's treatment of persistent column 140 that contains spatial data type values, storage server 130 infers or otherwise determines that data type 147 of persistent column 140 is a spatial object. In another example, storage server 130 receives offload computation request 180 to return rows that contain a JSON object in persistent column 140 that satisfy a json_contains function. From offload computation request 180's treatment of persistent column 140 that contains JSON data type values, storage server 130 infers or otherwise determines that data type 147 of persistent column 140 is JSON.

In another way of data type discovery, storage server 130 is configured by software to recognize certain data types stored in persistent column 140. For example, JSON objects in persistent column 140 may be stored as Oracle JSON (OSON). Storage server 130 may examine persistent column 140 while performing offload computation involving persistent column 140 and detect that the format of values in persistent column 140 conforms to OSON. Example implementations of OSON are described in (1) U.S. Pat. No. 10,262,012, Techniques Related to Binary Encoding of JSON documents to Support Efficient Path Navigation of the JSON documents, which is incorporated herein by reference in entirety, and (2) Closing the Functional and Performance Gap Between SQL and NoSQL, Proceedings of the 2016 International Conference on Management of Data, which is incorporated herein by reference in entirety.

For example, persistent column 140 may be stored as a sequence of bytes, and detection that column values 145 have data type 147 may entail detecting that the sequence of bytes begins with a predefined number. In an embodiment, data type 147 is discovered by inspecting one value or a small subset of values of column values 145.

Storage server 130 may create accelerated representation 150 during periods of low activity. Storage server 130 may record in storage-side metadata 160 that accelerated representation 150 has been created for a column stored within a range of memory addresses. An embodiment may operate storage-side memory 170 as a write-back or write-through cache that has an eviction policy such as least recently used (LRU) or least frequently used, and either of those eviction policies may be based on storage-side metadata 160, including access frequency 165. Storage-side metadata 160 may contain an access timestamp (not shown) that is updated whenever accelerated representation 150 is accessed. In an embodiment, the access timestamp is additionally or instead updated whenever persistent column 140 is accessed in storage-side memory 170. In an embodiment, the access timestamp is additionally or instead updated whenever persistent column 140 is accessed on disk. As discussed elsewhere herein, autonomous activity of storage server 130 is asynchronous in the background such as periodic. Autonomous inspection of the last access timestamp and/or access frequency 165 may trigger decisions such as: a) eviction (i.e. discarding) of accelerated representation 150, b) eviction of both accelerated representation 150 and persistent column 140 in storage-side memory 170, c) loading persistent column 140 into storage-side memory 170 without generating accelerated representation 150, d) generating accelerated representation 150 from persistent column 140 already loaded in storage-side memory 170, or e) loading persistent column 140 into storage-side memory 170 and immediately generating accelerated representation 150. Additionally or alternatively, any of those decisions (a)-(e) may be caused synchronously (i.e. in the foreground) by receiving offload computation request 180. For example when an offload computation request is received, immediate creation of an accelerated representation for one persistent column may cause immediate eviction of an accelerated representation of a different persistent column. Particular loading and generation scenarios are discussed later with FIG. 2.

In an embodiment and as discussed later herein, based on data type discovery, storage server 130 determines that the data type of column values 145 in persistent column 140 is JSON. Based on access frequency 165 of persistent column 140 as an offload input column within a certain range of memory addresses, storage server 130 determines to generate path-value index 155 and stores it in storage-side memory 170. Storage server 130 updates storage-side metadata 160 to indicate that path-value index 155 is an accelerated representation for persistent column 140 for address range 187.

2.0 Example Access Request Acceleration Process

FIG. 2 is a flow diagram that depicts an example procedure that storage server 130 may autonomously perform to accelerate execution of offload computation request 180 based on accelerated representation 150 in storage-side memory 170, in an embodiment. Although database server 110 sends offload computation request 180 and receives response 190, database server 110 does not perform any of the steps of FIG. 2. FIG. 2 is discussed with reference to FIG. 1.

Steps 201-203 may be autonomous and, for example, may occur: a) in the absence of an offload computation request, b) in the background while multiple offload computation requests execute, or c) in response to receiving a previous offload computation request before receiving offload computation request 180.

Based on data type discovery, step 201 detects that column values 145 in persistent column 140 have data type 147 as discussed earlier herein. In an embodiment, step 201 may occur as part of executing a previous offload computation request that accesses persistent column 140 before offload computation request 180 is received. In an embodiment, neither offload computation request 180 nor the previous offload computation request identifies data type 147.

Based on storage-side metadata 160 including access frequency 165 of persistent column 140 for offload computation requests on address range 187, step 202 decides to generate accelerated representation 150 of persistent column 140 based on data type 147. For example, step 202 may detect that access frequency 165 exceeds a threshold.

Step 203 stores accelerated representation 150 in storage-side memory 170. In an embodiment that includes path-value index 155, step 203 stores path-value index 155 in storage-side memory 170. For example, data type 147 may be JSON or XML, documents, and path-value index 155 may record offsets at which some or all paths that occur within documents in column values 145. Path-value index 155 may facilitate selection of documents based on a path as a lookup key.

Path-value index 155 contains a dictionary and a posting list. The dictionary in path-value index 155 operates as a lookup table that maps distinct paths of JSON fields in JSON objects of column values 145 to respective posting lists. The respective posting list of a distinct JSON path list rows that holds a JSON object in persistent column 140 that include one or more instances of the JSON field, and for each instance, an offset or other location information of the JSON field within the JSON object.

Granularity of path-value indexes depends on the embodiment. For example, column values 145 may contain JSON documents, and accelerated representation 150 may contain multiple path-value indexes. In an embodiment, each address range, such as address range 187, may have a respective separate path-value index in accelerated representation 150, and path-value index 155 may index all JSON documents of column values 145. In another embodiment, address range 187 spans multiple storage blocks, and each storage block may have a respective separate path-value index in accelerated representation 150.

If data type 147 instead is spatial in an embodiment, accessing of spatial data in a GeoJSON geometry object in column values 145 may be accelerated by step 203 creating a spatial index in accelerated representation 150.

Steps 204-205 involve offload computation request 180. From database server 110, step 204 receives offload computation request 180 to perform, at storage server 130, offload computation 183 for persistent column 140 as an offload input column.

Based on accelerated representation 150 and the offload input column, step 205 executes offload computation request 180, including offload computation 183. In an embodiment discussed earlier herein, persistent column 140 may reside in storage-side memory 170 and on disk, but step 205 does not access persistent column 140 on disk. If accelerated representation 150 contains any index herein for random access of any value in column values 145, then executing offload computation 183 does not entail scanning column values 145 in persistent column 140, and this scan avoidance by random access provides acceleration.

Step 205 may return result data in response 190 to database server 110. Because database server 110 and storage server 130 are cooperating computers, steps 204-205 may transfer information over a communication network to accomplish a round trip.

3.0 Exemplary Embodiment

In this exemplary embodiment, based on discovered data type 147, autonomous step 203 generates bytecode that accesses accelerated representation 150. Offload computation 183 entails filtration or projection, for which requested step 205 executes the bytecode by interpretation or by compilation to machine instructions of an instruction set architecture (ISA) of a central processing unit (CPU) in storage server 130.

Storage server 130 may execute a request to update a value of column values 145, which may cause accelerated representation 150 to no longer be consistent with column values 145. In this case, the accelerated representation can be deleted and may later be regenerated.

4.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

3.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
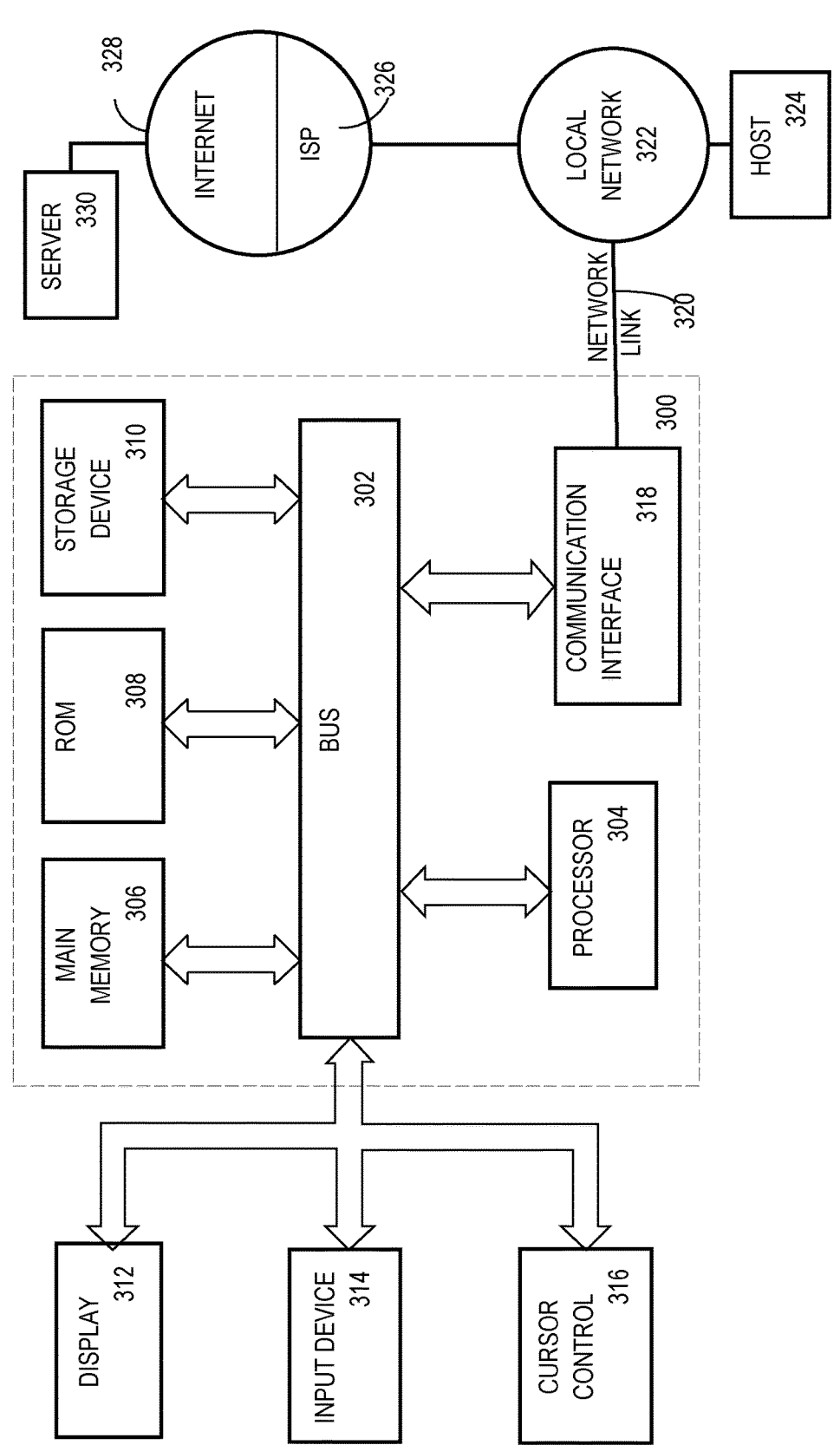
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor

304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing a persistent column as a sequence of bytes in a database;
detecting that the sequence of bytes begins with a predefined value;
deciding, based on said detecting, that column values in the persistent column have a particular data type;
determining, based on a frequency of access of the persistent column as an offload input column for offload computation requests on a certain range of memory addresses, to generate an accelerated representation of the persistent column based on the particular data type;
storing, in memory in a storage server, the accelerated representation of the persistent column;
generating based on the particular data type, after said determining, bytecode that accesses the accelerated representation of the persistent column;
receiving from a database server, through a communication network, a request to perform an offload computation, at the storage server, for the offload input column; and
executing the request, including executing the offload computation, including executing the bytecode that accesses the accelerated representation of the persistent column;
wherein the method is performed by the storage server.

2. The method of claim 1 wherein the request to perform the offload computation does not indicate a datatype of the persistent column.

3. The method of claim 1 wherein each value in the column values in the persistent column is a separate semi-structured document.

4. The method of claim 1 wherein said executing the offload computation comprises compiling the bytecode that accesses the accelerated representation of the persistent column.

5. The method of claim 1 wherein the accelerated representation of the persistent column comprises at least one selected from a group consisting of a posting list, a dictionary, and a spatial index.

6. The method of claim 1 wherein the request to perform the offload computation identifies at least one selected from a group consisting of a json_contains function and a spatial_filter function.

7. The method of claim 1 wherein said executing the offload computation does not entail scanning the column values in the persistent column.

8. The method of claim 1 wherein the certain range of memory addresses specifies a block address of a persistent storage block.

9. The method of claim 1 wherein said determining to generate the accelerated representation of the persistent column occurs asynchronously.

10. One or more non-transitory computer-readable media storing instructions that, when executed by a storage server, cause:
storing a persistent column as a sequence of bytes in a database;
detecting that the sequence of bytes begins with a predefined value;
deciding, based on said detecting, that column values in the persistent column have a particular data type;
determining, based on a frequency of access of the persistent column as an offload input column for offload computation requests on a certain range of memory addresses, to generate an accelerated representation of the persistent column based on the particular data type;
storing, in memory in a storage server, the accelerated representation of the persistent column;
generating based on the particular data type, after said determining, bytecode that accesses the accelerated representation of the persistent column;
receiving from a database server, through a communication network, a request to perform an offload computation, at the storage server, for the offload input column; and
executing the request, including executing the offload computation, including executing the bytecode that accesses the accelerated representation of the persistent column.

11. The one or more non-transitory computer-readable media of claim 10 wherein the request to perform the offload computation does not indicate a datatype of the persistent column.

12. The one or more non-transitory computer-readable media of claim 10 wherein each value in the column values in the persistent column is a separate semi-structured document.

13. The one or more non-transitory computer-readable media of claim 10 wherein said executing the offload computation comprises compiling the bytecode that accesses the accelerated representation of the persistent column.

14. The one or more non-transitory computer-readable media of claim 10 wherein the accelerated representation of the persistent column comprises at least one selected from a group consisting of a posting list, a dictionary, and a spatial index.

15. The one or more non-transitory computer-readable media of claim 10 wherein the request to perform the offload computation identifies at least one selected from a group consisting of a json_contains function and a spatial_filter function.

16. The one or more non-transitory computer-readable media of claim 10 wherein said executing the offload computation does not entail scanning the column values in the persistent column.

17. The one or more non-transitory computer-readable media of claim 10 wherein the certain range of memory addresses specifies a block address of a persistent storage block.

* * * * *